4 Sheets—Sheet 3.
G. H. SELLERS.
MACHINES FOR WELDING, UPSETTING AND SHAPING IRON.
No. 178,966. Patented June 20, 1876.
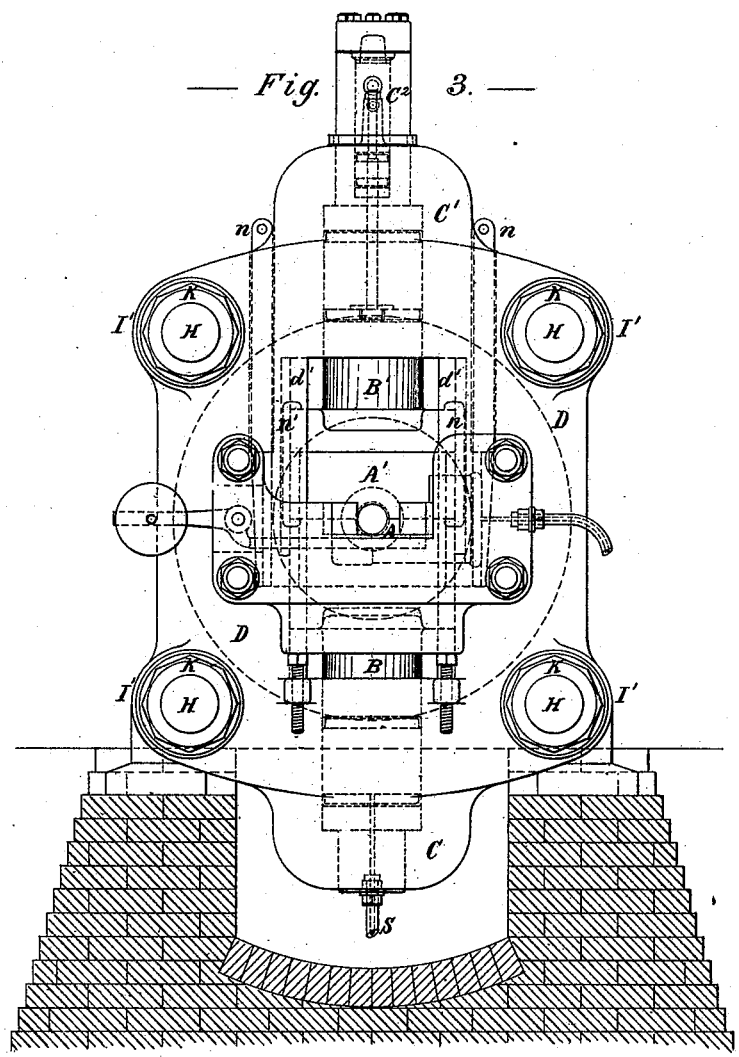
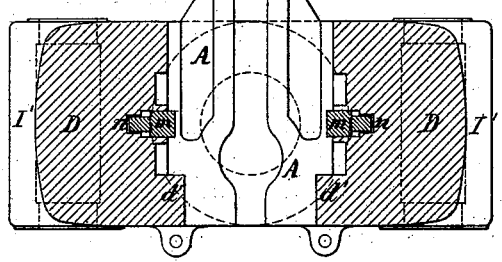

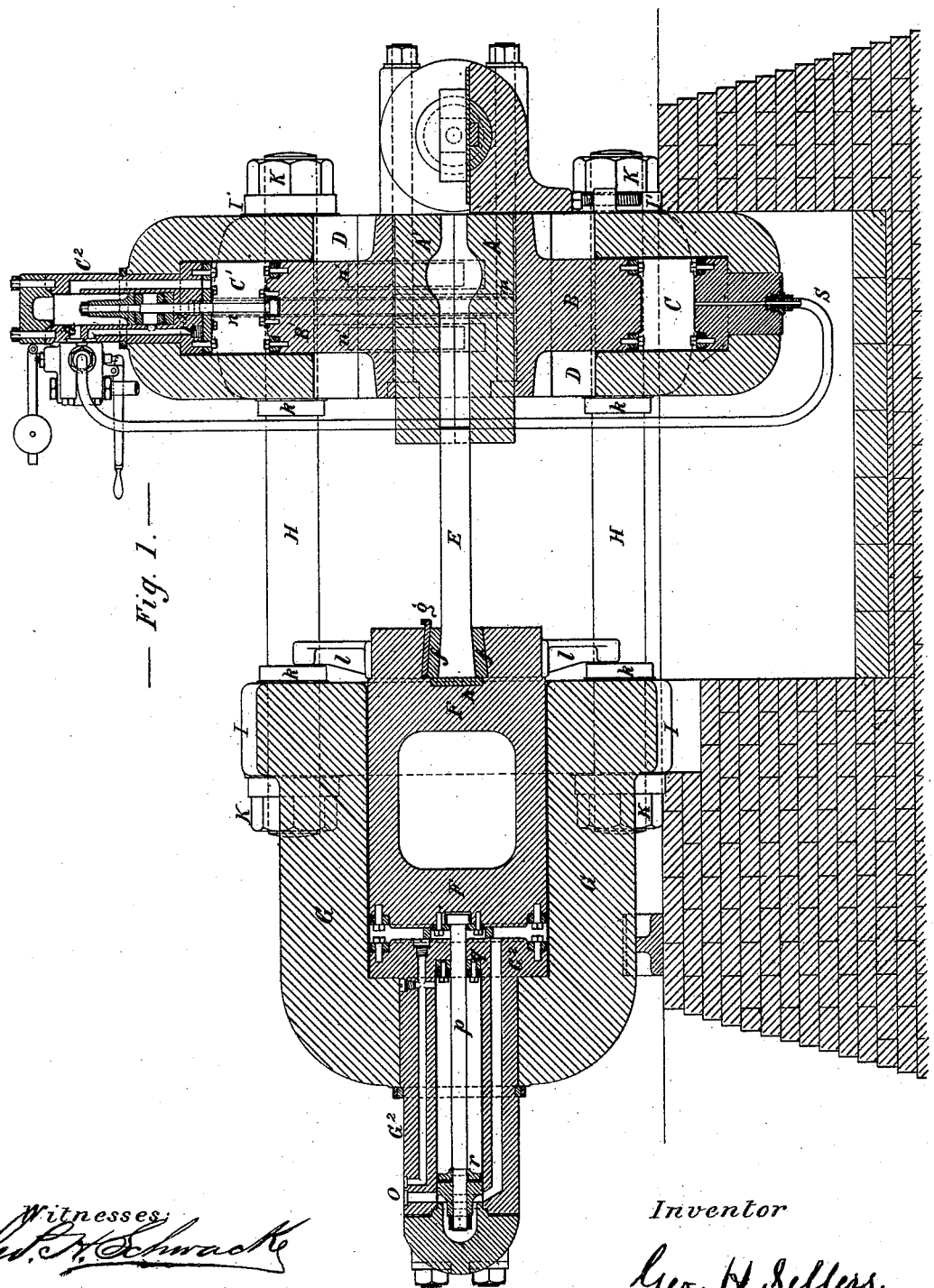

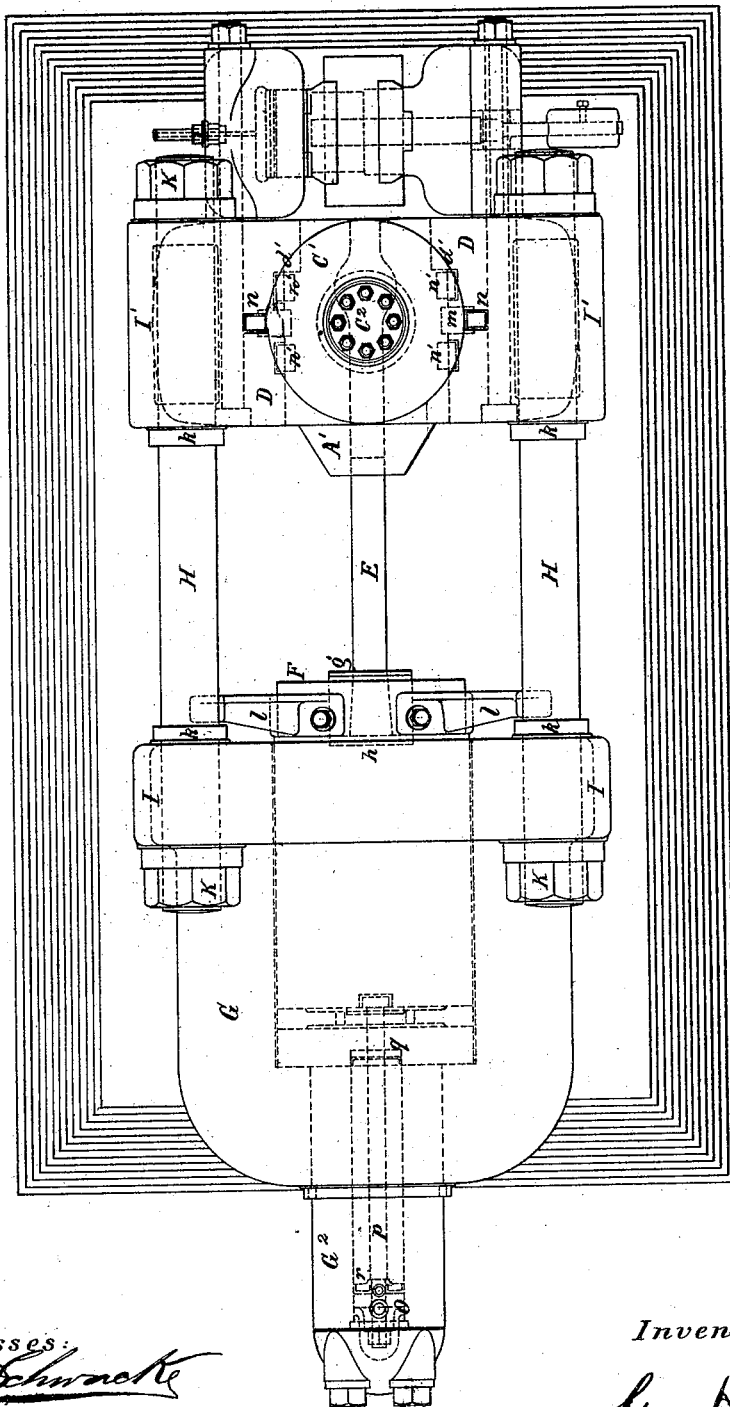

4 Sheets—Sheet 4.

G. H. SELLERS.
MACHINES FOR WELDING, UPSETTING AND SHAPING IRON.

No. 178,966. Patented June 20, 1876.

Witnesses
N. A. Fulton
W. M. Kimber

Inventor:
Geo. H. Sellers
by his Atty
Henry Baldwin Jr.

UNITED STATES PATENT OFFICE.

GEORGE H. SELLERS, OF WILMINGTON, DELAWARE, ASSIGNOR TO WILLIAM SELLERS AND JOHN SELLERS, JR., OF PHILADELPHIA, PENNSYLVANIA.

IMPROVEMENT IN MACHINES FOR WELDING, UPSETTING, AND SHAPING IRON.

Specification forming part of Letters Patent No. 178,966, dated June 20, 1876; application filed December 7, 1874.

*To all whom it may concern:*

Be it known that I, GEORGE H. SELLERS, of the city of Wilmington, in the county of New Castle and State of Delaware, have invented certain new and useful Improvements in Machines for Welding, Upsetting, and Shaping Iron, of which improvements the following is a specification:

It is the object of my invention to employ hydraulic pressure for operating the welding or shaping die as well as the upsetting-ram, thereby avoiding the frictional resistance to the opening of the die incident to this operation, if any mechanical power were employed to close it. It is also the object of my invention to lock the die when closed so that a pressure within it greater than that required to close it will not open it, and with such increase of pressure within the die to unlock it, without exerting any appreciably increased power over that required to lock it; and to these ends my invention consists in combining with the upsetting-ram a welding or shaping die closed by hydraulic pressure; also, in combining the upsetting-ram and a die closed by hydraulic pressure with a hydraulic drawback and a locking-valve; also, in combining the upsetting-ram and a die closed by hydraulic pressure with balanced induction and eduction valves. In addition to these distinctive features, my invention comprises other combinations and improvements in construction, as hereinafter described and specified.

Figure 5:
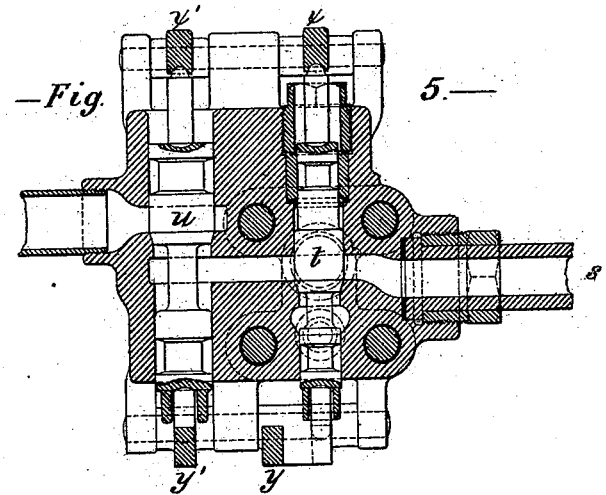
Figure 6:
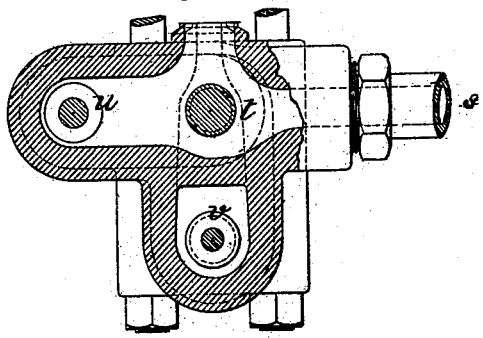
Figure 7:
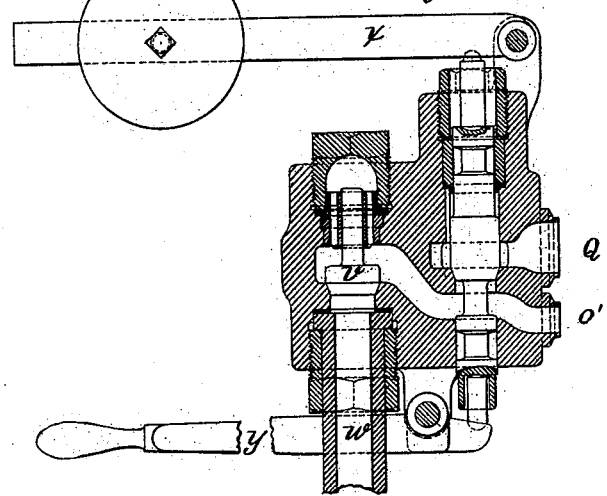

In the accompanying drawings, which make part of this specification, Figure 1 is a sectional side elevation of a hydraulic machine for welding, upsetting, and shaping iron embodying my invention; Fig. 2, a plan of the machine; Fig. 3, an end view of the same; and Fig. 4 a section in the parting plane of the die. Fig. 5 is an elevation of the valve-case in section upon a plane passing through the axes of the induction and eduction valves, the pipe communicating with lower cylinder and the exhaust-pipe. Fig. 6 is a cross-section of valve-case, showing the locking check-valve in its relation to the induction and eduction valves; and Fig. 7 is a vertical section of the valve-case on a plane passing through the induction and locking check-valves and the inlet-pipe.

A is the lower half, and A' the upper half, of the compressing-die, having a horizontal plane of separation. These halves of the parting-die are secured to rams or pistons B B', moving at right angles to the horizontal plane of separation of the die within the hydraulic compressing-cylinders C and $C^1$, which form a part of the compressing-frame D. E is the upsetting-bar attached to the upsetting-ram F, moving horizontally within the hydraulic upsetting-cylinder G, Figs. 1 and 2, which has its axis at right angles to that of cylinders C and $C^1$, and parallel to the plane of separation of the parting-die A A'. The heavy tension-rods H H, placed equidistant from, and parallel to, the axis of the upsetting-ram, connect the upsetting-cylinder G to the frame D. Stout lugs or bosses I I are provided on the cylinder G for the reception of these tension-rods at one end. Similar lugs I' I' sustain the other ends of these rods in the frame D. All tensional strain is received against the nuts K K, while the inside collars $k$ $k$ serve to maintain all parts duly in line with each other. The piston F is guided upon the rods H H by means of the brackets $l$ $l$, extending radially from the forward end of the piston F, to which they are securely bolted. The upsetting-bar E is enlarged at the end toward the upsetting-ram F, and held securely between the two halves, $f$ $f$, of a clamping-box, which is secured in a dovetailed recess to the ram F by means of a flat key, $g$, the enlarged inner end of upsetting-bar E bearing against a steel thrust-plate, $h$, to withstand the compressive strain of the work. The two parallel guide-connections between the hydraulic compressing-cylinders C $C^1$ form, together with the opposing faces of these two cylinders, a rectangular oblong opening in frame D of sufficient clear space between its parallel sides to admit the dies for the largest work required of the machine. The sectional area of these two sides is such as to resist the compressive action of the upsetting-ram in one direction, and in a direction at right angles thereto the expanding tendency of the metal in the die as it is being upset. The direct strain upon the die from the action of the upsetting-ram is expended against the shoulders $d'$ $d'$, extending the whole length of the space between the two cylinders, while the indirect strain from the expanding tendency of the metal in the die, as it is being upset, is expended upon the pistons in the compressing-cylinders, and is sustained by the water confined therein. In addition to the shoulders $d'$ $d'$ resisting end pressure upon the die in one direction, a means is provided to hold the die securely in place against any strain that may be exerted upon it in the opposite direction, either by the friction against the sides of the die in withdrawing the upsetting-ram or during the insertion of the bar to be operated upon, and this means of securely holding the halves of the die in position also affords a convenient means of changing the same and regulating the traverse upward of the lower ram B. It consists of two square keys, $m$ $m$, vertically supported within the sides of the frame D, their movement prevented vertically, and in the direction of the axis of the upsetting-ram, by the ends and sides of the recesses or grooves in the frame D, in which they are placed. Corresponding grooves are provided in the dies A A'. At the rear of each of the keys $m$ $m$ a second but inclined recess is provided corresponding with the wedge-bars $n$ $n$ inserted from above. Thus when these bars are withdrawn above the keys $m$ $m$ the latter can be easily pushed back to the full depth of their recesses, so as to permit the withdrawal of the die in the direction of the upsetting-cylinder. The required die being replaced, the bars $n$ $n$ are lowered to the bottom of the recesses, and this causes the wedging action of the beveled surfaces to push the keys $m$ $m$ bodily inward, so as to occupy the grooves in the dies A A', and thus lock the same securely against any pressure that may tend to move them toward the upsetting-ram. The movement of the keys $m$ $m$ being prevented vertically, the position of their lower ends will determine the traverse of the lower piston B. In parting the die, its lower half A follows the descending piston B by its own weight. The upper die A', however, must be secured to the ascending piston B' to be lifted by it. This is done by means of the gibs $n'$ $n'$, provided in pairs on both sides of the die, and playing freely in suitable recesses within the frame D. The die A' is not rigidly clamped to the T-head of piston B' by means of these gibs, but only loosely suspended, in order that this half of the die may be changed as easily as the lower half, while the gibs remain suspended upon the head of B' by their upper projections. To withdraw the upper half of the parting-die, and also the upsetting-ram, without the use of counter-weights, I provide the drawback-cylinders $C^2$ and $G^2$, their construction and application being identical, the detailed description of the hydraulic drawback applied to the upsetting-ram F will suffice.

The piston-rod $p$, attached to the rear end of the upsetting-ram, (see Fig. 1,) passes through a stuffing-box, $q$, into the drawback-cylinder $G^2$, in which it is fitted with a piston, $r$.

For a description in detail of the improved drawback, illustrated in Figs. 1, 2, and 3 of the accompanying drawings, I refer to an application filed of even date herewith, by Coleman Sellers, for an improvement in the hydraulic drawback of plungers or rams in hydraulic machines.

To operate the pistons in the upsetting-cylinder G, and the compressing-cylinders C and $C^1$, water under suitable pressure is admitted to and allowed to escape from the openings O and O' and the pipe S. For this purpose I employ balanced hydraulic puppet-valves, preferably such as shown in Figs. 5, 6, and 7, in which $t$ represents the pressure or induction valve, $u$ the eduction, and $v$ the locking check-valve over the inlet-pipe $w$. The induction and eduction valves $t$ and $u$ are balanced against any pressure tending to open them by packed pistons upon their stems above and below the valves, having areas corresponding respectively to the areas of the upper and lower planes of cross-section of the valves themselves. They are held firmly to their seats by the weighted levers $x$ and $x'$, and are raised at will by means of the hand-levers $y$ and $y'$. The pipe S conveys the water from the valve-case to the compressing-cylinder C, while the opening Q admits the water at the same time into the cylinder $C^1$.

The operation is as follows: Water, under suitable pressure, enters the valve-case through the pipe $w$, raises the check-valve $v$, and passes through the opening $o'$ under the drawback-piston, which is provided with cup-leather packing to prevent its escape. If, now, the exhaust-valve $u$ is raised to permit the escape of the water above the upper and below the lower main rams and the drawback-piston, the constant pressure from the reservoir under the latter will cause the drawback-piston to rise, carrying with it the compressing-piston in the upper cylinder, while the weight of this lower piston and its die will force out the water from the lower cylinder, and the lower piston and die will descend. When the upsetting-pressure is to be used water is admitted to the compressing-cylinders through the induction-valve until the compressing-die is closed. The induction-valve is then closed, so that both the induction and eduction valves to the compressing-cylinders are closed. The upsetting-pressure is then applied, which may and usually does exert a pressure within the die to open it in excess of that required to close it, under which circumstances the locking check-valve $v$ prevents the water from the upper compressing-cylinders from flowing back to the reservoir, which it would do by passing the packing in the drawback-piston, it being a cup-leather arranged to withstand pressure in the opposite direction, and effecting its escape through the induction-pipe under the drawback-piston.

It will thus be seen that the compressing-die is not only closed and securely locked against the expanding tendency of the upsetting operation, but that this expanding pressure in nowise impairs the facility with which the die can be unlocked. This result could not be attained with any of the mechanical powers, as their use would involve the necessity of sliding surfaces under great pressure, and consequent friction, producing resistance proportioned to the pressure.

In many classes of work it is unnecessary to move the lower die, in which case it may be blocked up to the proper height. The water in the lower cylinder will then not be displaced when the eduction-valve is opened, and this die will remain stationary, but supported by the water, as before described, during the operation of welding and upsetting.

The machine, as described, although specially adapted to welding, upsetting, and shaping iron is equally well adapted to upsetting and shaping alone.

A clamping arrangement must be provided in front of the parting-dies for holding the bar to be upset in the first instance, until it partially fills the dies; and in the practice of my invention heretofore this bar has been clamped by two opposing cams, which tighten against the sides of the bar as the end pressure is exerted. The improved clamping mechanism illustrated in the present drawing forms the subject of a distinct application filed of even date herewith by William Sellers, and is fully described in the specification forming a part of said application.

With the ordinary hydraulic drawback, or the drawback operated by a weight or spring, the locking check-valve will not be required, the balanced hydraulic inlet and outlet valves operating to retain the water within the compressing-cylinders against the upsetting-pressure; and I therefore do not limit my claim to this locking-valve shown in the preferred construction. I contemplate using any of the known forms of balanced valves, and either a single valve which serves both for induction and eduction or separate induction and eduction valves. I also contemplate having the lower part of the compressing-die fixed, or having both parts movable, as in the instance shown in the drawings.

I prefer to use separate accumulators for the ram and the compressing-die, although a single one may operate both. Such modifications are all within the skill of the constructor.

Having thus fully described my invention, what I claim as new, and desire to secure by Letters Patent, is—

1. The combination of a compressing-cylinder with a compressing-die and an upsetting-ram, substantially as and for the purposes set forth.

2. The combination of a compressing-cylinder, a compressing-die, an upsetting-ram, and a locking check-valve, substantially as and for the purposes set forth.

3. The combination of a compressing-cylinder, a compressing-die, an upsetting-ram, a balanced induction-valve, and a balanced eduction-valve, substantially as and for the purposes set forth.

4. The combination of a compressing-cylinder, a compressing-die, an upsetting-ram, a balanced induction-valve, a balanced eduction-valve, and a drawback, substantially as described.

5. The combination of a compressing-cylinder, a compressing-die, an upsetting-ram, a locking check-valve, a balanced induction-valve, and a balanced eduction-valve, substantially as and for the purposes set forth.

6. The combination of the compressing-cylinder, the compressing-die, the keys $m\ m$, and wedge-bars $n\ n$ to limit the vertical movement of the lower compressing-die, and facilitate the removal of the compressing-dies, substantially as described.

In testimony whereof I have hereunto subscribed my name.

GEO. H. SELLERS.

Witnesses:
 EDWARD GARRET,
 JOS. RICHARDSON.